Jan. 19, 1926. 1,570,602
J. W. HOBBS
APPARATUS FOR MEASURING THE TEMPERATURE OF INTERNAL COMBUSTION ENGINES
Filed Dec. 22, 1921
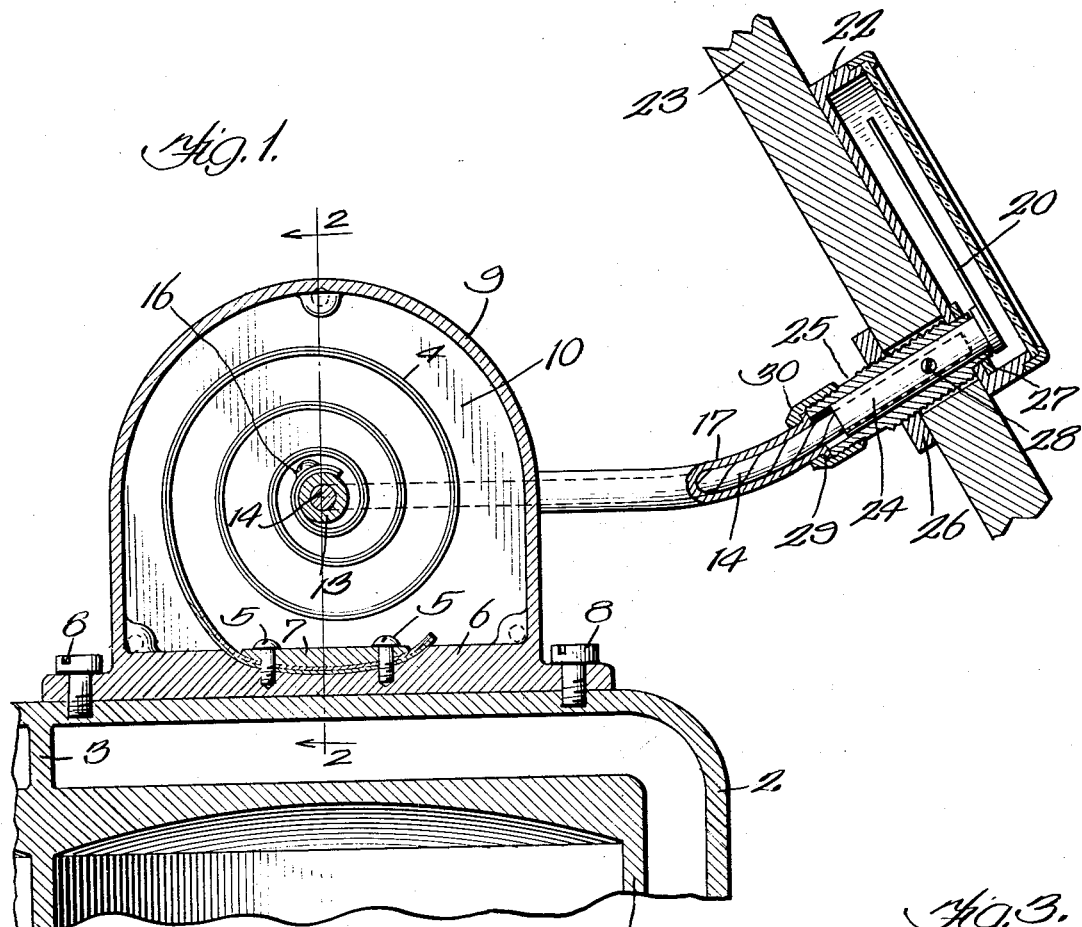
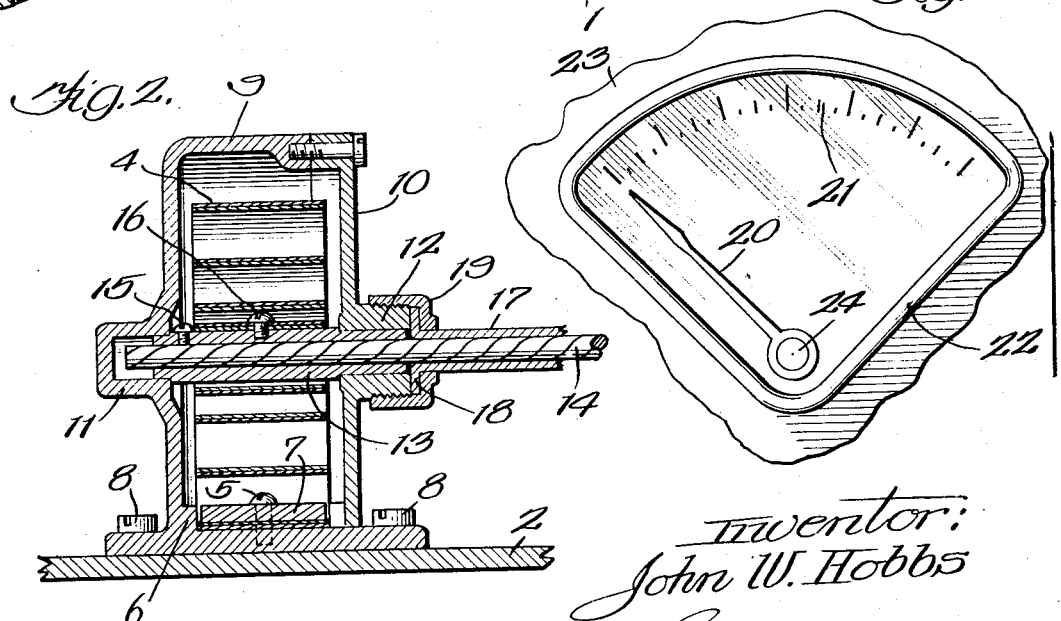
Inventor:
John W. Hobbs
By G. L. Cragg, Atty.

Patented Jan. 19, 1926.

1,570,602

UNITED STATES PATENT OFFICE.

JOHN W. HOBBS, OF MOLINE, ILLINOIS, ASSIGNOR, BY MESNE ASSIGNMENTS, TO PYRENE MANUFACTURING COMPANY, OF NEWARK, NEW JERSEY, A CORPORATION OF DELAWARE.

APPARATUS FOR MEASURING THE TEMPERATURE OF INTERNAL-COMBUSTION ENGINES.

Application filed December 22, 1921. Serial No. 524,132.

*To all whom it may concern:*

Be it known that I, JOHN W. HOBBS, citizen of the United States, residing at Moline, in the county of Rock Island and State of Illinois, have invented a certain new and useful Improvement in Apparatus for Measuring the Temperature of Internal-Combustion Engines, of which the following is a full, clear, concise, and exact description.

My invention relates to internal combustion engines and has for its object the provision of an improved form of temperature measuring apparatus to be used in connection therewith, this temperature measuring apparatus being of particular service when employed in conjunction with engine cooling means such as a radiator employing cooling water.

Instruments of this class are commonly termed motor meters and among such meters are those which employ thermostatic elements subject to the temperature of the cooling fluid and operating an indicating device through the intermediation of toothed gearing. It is the object of my invention to eliminate such gearing and in realizing this object I form the thermostatic element in the shape of a spiral, one end of the thermostat being anchored and the other end being free to turn in response to temperature changes. A shaft connects this end of the thermostat with a termperature indicator. If the engine is employed in an automobile power plant the temperature indicator is placed upon a dashboard and the shaft which connects it with the engine is flexible so that the thermostat may continue to transmit movement to the indicator irrespective of the relative movements that occur between the vehicle body and the engine supporting chassis. The flexible shaft is also of service where the engine is employed in other power plants as it enables the transmission of motion to the temperature indicator without having this indicator materially influenced by the vibrations and other possible movements of the engine with respect to the mounting for the indicator.

The invention will be fully explained by reference to the accompanying drawing in which Fig. 1 is a sectional view indicating a portion of an internal combustion engine and a part of a jacket of a cooling radiator, the thermostat being indicated upon the radiator also in section, this figure also showing the flexible shaft and an indicator coupled with the thermostat by the shaft; Fig. 2 is a sectional view on line 2—2 of Fig. 1; and Fig. 3 is a front elevation of one form of temperature indicating instrument.

Like parts are indicated by similar characters of reference throughout the different figures.

The internal combustion engine of which a portion is illustrated is of the reciprocating type whose explosive chambers are in the form of engine cylinders 1 that contain the usual reciprocating pistons. The engine illustrated is of the water cooled type, there being an enclosing metal jacket 2 spaced apart from the cylinders of the engine and which is brought into metallic connection with the engine cylinders by means of metallic bridge portions 3. The bimetallic spirally formed thermostatic element 4 has one end, preferably its outer end, anchored in place by means of clamping screws 5 that pass through the anchored end of the thermostat and into the metal mounting block 6. These screws preferaby also pass through a shoe 7 that conforms to the curvature of the anchored end of the thermostat in order that intimate contact of sufficiently wide extent may be insured between the metal mounting block 6 and the thermostat. This mounting block is maintained in intimate contact with the metal jacket 2 by means of the clamping screws 8. The thermostatic element is thus rendered delicately responsive to the changes in the temperature of the engine and while I prefer to employ metallic bridge pieces 3 that enhance this result, I do not wish to be limited thereto.

In order to protect the thermostat it is provided with a housing having a body portion 9 and a closure portion 10. These housing portions are respectively provided with hub portions 11 and 12 which receive and constitute bearings for the reduced end of a sleeve 13 whose larger intermediate portion has thrusting engagement with the inner ridges of the walls of the housing which carry said hub portions. This sleeve receives the flexible shaft 14 and is coupled therewith by means of the screw 15. The inner end of the thermostatic element is assembled with the sleeve by means of the screws 16. The sheath 17 of the flexible shaft is formed with a flange 18 that is positioned between the outer end of the hub portion 12 and a cap nut 19. The flexible shaft and its sheath are continued to the locality of the temperature indicating device which may be in the form of an indicating needle 20 arranged to sweep over a temperature scale 21, the needle and the scale being contained within a triangular housing 22. In an automobile this housing or box is located upon the dashboard 23 which is formed with a hole through which the elongated sleeve-like hub 24 of the needle 20 is passed. This hub is mounted to rotate within a bearing 25 that also passes through the dashboard and is held in assembly therewith by means of the nut 26 having threaded engagement with the exterior of the sleeve 25. The nut 26 on sleeve 25 is upon the rear side of the dashboard and the ring nut 27 on the same sleeve is upon the front side of the dashboard and within the housing 22, the nuts and sleeve serving to clamp the dashboard and the bottom of said housing together. The flexible shaft 14 is assembled with the hub sleeve 24 of the needle 20 by means of a screw 28. The shaft sheath 17 is formed with a flange 29 at the dashboard end thereof, this flange being clamped in position between the adjacent end of the bearing 25 and a sleeve nut 30, this sleeve nut being in threaded engagement with the bearing 25 for this purpose. When the inner end of the thermostat turns in response to temperature changes the shaft 14 correspondingly turns to correspondingly turn the temperature indicating needle 20, movement of the thermostat being directly transmitted to the shaft without the employment of any toothed gearing.

While I prefer to connect the inner end of the coiled thermostatic element with the shaft and to anchor the outer end of such element, I do not wish to be limited to such an arrangement.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

In a temperature measuring apparatus for internal combustion engines, the combination with an internal combustion engine; of a spirally formed thermostatic element having its outer end assembled with the engine cylinder; a flexible shaft connected at one end with the inner end of the thermostatic element to be turned thereby as the thermostatic element responds to temperature changes; and a temperature indicator coupled with the other end of said shaft.

In witness whereof I hereunto subscribe my name this 15th day of December, A. D., 1921.

JOHN W. HOBBS.